(12) United States Patent
Shao et al.

(10) Patent No.: US 11,967,716 B2
(45) Date of Patent: Apr. 23, 2024

(54) PREPARATION METHOD AND APPLICATION FOR METAL SULFIDE HOLLOW MICROSPHERES WITH ENRICHED SULFUR VACANCIES

(71) Applicant: BEIJING INSTITUTE OF TECHNOLOGY, Beijing (CN)

(72) Inventors: Ziqiang Shao, Beijing (CN); Shuai Jia, Beijing (CN); Jie Wei, Beijing (CN); Zhen Huang, Beijing (CN); Baixue Gong, Beijing (CN)

(73) Assignee: Beijing Institute of Technology, Beijing (CN)

( * ) Notice: Subject to any disclaimer, the term of this patent is extended or adjusted under 35 U.S.C. 154(b) by 157 days.

(21) Appl. No.: 17/584,732

(22) Filed: Jan. 26, 2022

(65) Prior Publication Data
US 2022/0246934 A1    Aug. 4, 2022

(30) Foreign Application Priority Data

Feb. 4, 2021    (CN) .......................... 202110154262.3

(51) Int. Cl.
*H01M 4/58*    (2010.01)
*C01G 53/11*    (2006.01)
*H01M 4/02*    (2006.01)

(52) U.S. Cl.
CPC .......... *H01M 4/5815* (2013.01); *C01G 53/11* (2013.01); *C01P 2002/72* (2013.01); *C01P 2002/85* (2013.01); *C01P 2004/03* (2013.01); *C01P 2004/04* (2013.01); *C01P 2004/34* (2013.01); *C01P 2006/40* (2013.01); *H01M 2004/021* (2013.01)

(58) Field of Classification Search
None
See application file for complete search history.

(56) References Cited

PUBLICATIONS

English translation of Dong et al. CN 106542585 (Year: 2018).*
English translation of Chen et al. CN 111573747 (Year: 2020).*

* cited by examiner

*Primary Examiner* — Ronak C Patel
(74) *Attorney, Agent, or Firm* — McDonnell Boehnen Hulbert & Berghoff LLP (57) ABSTRACT

Disclosed is a hollow sulfide microsphere with enriched sulfur vacancies, which is prepared by a method comprising the steps of: dissolving cobalt nitrate and nickel nitrate in a mixed solution of N, N-dimethylformamide and acetone with an equal volume; then adding a chelating agent thereto, subjecting a resulting mixture to a solvothermal reaction to obtain a coordination polymer microsphere; dissolving the coordination polymer microsphere and a sulfurization agent in an organic solvent, and reacting to obtain a hollow sulfide microsphere; and subjecting the hollow sulfide microsphere to reduction treatment with sodium borohydride, centrifuging, washing and drying to obtain the hollow sulfide microsphere with enriched sulfur vacancies having a particle size of 1-2.5 μm, a shell thickness of 15-30 nm and a specific capacity of the material of 763.4 C $g^{-1}$ (current density is 1 A $g^{-1}$).

18 Claims, 8 Drawing Sheets

PREPARATION METHOD AND APPLICATION FOR METAL SULFIDE HOLLOW MICROSPHERES WITH ENRICHED SULFUR VACANCIES

CROSS REFERENCE TO RELATED APPLICATION

This patent application claims the benefit and priority of Chinese Patent Application No. 202110154262.3 filed on Feb. 4, 2021, the disclosure of which is incorporated by reference herein in its entirety as part of the present application.

TECHNICAL FIELD

The present disclosure is related to the field of chemical materials, and more particularly to a preparation method and application for metal sulfide hollow microspheres with enriched sulfur vacancies.

BACKGROUND ART

Supercapacitors (SCs) have gained extensive attention by virtue of their high power density and long cycling durability. Given that the energy density of SCs is between secondary batteries and traditional capacitors, so how to improve the performance of supercapacitors as much as possible without sacrificing their advantages is the current research mainstream. The construction of hybrid capacitors using an active material having an electrical double-layer capacitance as a negative electrode and a battery-grade electrode material with a redox behavior as a positive electrode can achieve high energy density while ensuring high power density. Construction of hybrid supercapacitors, composed of a negative electrode with the typical features of electrical double layer capacitance and a positive electrode with battery-type electrochemical behavior, can simultaneously fulfill high energy and power densities. Therefore, the performance improvement of SCs mainly depends on the morphologies and properties of electrode materials.

Transition metal sulfides (TMSs) have been employed as an attractive candidate in SCs owing to their high theoretical capacity, large reserves and low cost, as well as multi-electron participation in electrochemical reactions. However, the lower conductivity of TMSs and expansion of the lattice structure occurring in the redox reactions result in the poor rate capability and stability.

Therefore, it is urgent to prepare the TMSs electrode materials with excellent conductivity and stability via a facile and reasonable method.

SUMMARY

The present disclosure is to provide a transition metal sulfide hollow microsphere with enriched sulfur vacancies prepared through a simple approach under mild reaction conditions, revealing a high specific capacity of 763.4 C g$^{-1}$ as an electrode.

A technical scheme of the present disclosure is as follows: hollow sulfide microspheres with enriched sulfur vacancies are prepared by a method comprising the steps of:
1) dissolving cobalt nitrate and nickel nitrate in a mixed solution of N, N-dimethylformamide and acetone to obtain a solution A;
2) dissolving a chelating agent with a carboxylate group in the solution A to obtain a solution B;
3) transferring the solution B into a stainless-steel autoclave lined Teflon and reacting at 140-160° C. for 1-5 h, cooling, centrifuging, washing and drying to obtain coordination polymer microspheres;
4) dissolving the coordination polymer microspheres and a sulfurization agent in an organic solvent, reacting at 120-160° C. for 0.5-6 h, cooling, centrifuging, washing and drying to obtain the sulfide hollow microspheres;
5) dispersing the hollow sulfide microsphere in a sodium borohydride solution, stirring for 0.5-2 h, centrifuging, washing and drying to obtain the hollow sulfide microsphere with enriched sulfur vacancies.

In step 1), a volume ratio of N, N-dimethylformamide and acetone is 1:1, and a molar ratio of cobalt nitrate and nickel nitrate is 2-4:1-2.

In step 2), the chelating agent is selected from the group including isophthalic acid, trimesic acid, terephthalic acid, and 3,5-pyridinedicarboxylic acid. The chelating agent is dissolved in the solution A and stirred for 6 h, and a ratio of a molar amount of the chelating agent to a total molar amount of cobalt nitrate and nickel nitrate is 1-2:2-4.

In step 3), the washing is conducted by absolute ethanol, and the drying is under vacuum.

In step 4), the sulfurization agent is selected from the group including thioacetamide, thiourea, L-cysteine, and sodium sulfide, and a mass ratio of the coordination polymer microsphere to the sulfurization agent is 2-4:1-8.

In step 4), the organic solvent is absolute ethanol, and the dispersion is conducted with ultrasound for 15 min.

In step 4), the washing is conducted by washing with absolute ethanol, and the drying is under vacuum.

In step 5), a concentration of the aqueous sodium borohydride solution is 0.5-2 mol/L, preferably 1 mol/L, the washing is conducted by washing with deionized water, and the drying is vacuum drying.

A particle size of the hollow sulfide microspheres with enriched sulfur vacancies is 1-2.5 μm, and a shell thickness is 15-30 nm.

The present disclosure also provides a use of the hollow sulfide microsphere with enriched sulfur vacancies described in above technical schemes for preparing electrode materials.

In some embodiments, the electrode material is a battery-type electrode material.

The above technical scheme has the following beneficial effects:

1. In the present disclosure, a nickel-cobalt hollow sulfide, derived from the coordination polymer spheres as self-templates, has been fabricated via a solvothermal reaction, followed by a reduction treatment using an aqueous sodium borohydride solution to obtain the hollow sulfide microspheres with enriched sulfur vacancies. Among them, the hollow structure has a structural buffering effect which can improve the stability of the electrode material; the introduction of sulfur vacancies not only adjusts the electronic structure of sulfides to improve the electrical conductivity, but also increases the electrochemical active sites, thereby improving the electrochemical performance.
2. In the present disclosure, cobalt nitrate, nickel nitrate and chelating agent are dissolved in a mixed solution of N, N-dimethylformamide and acetone to ensure complete dissolution. If other single-component solvents are used, precipitation will occur, resulting in the failure of subsequent reactions to proceed normally; by controlling the ratio of the molar amount of the chelating agent to the total molar amount of cobalt nitrate and nickel nitrate to be 1-2:2-4, the temperature of solvothermal reaction to be 140-160° C. and the reaction time to be 1-5 h, the coordination polymer microspheres with relatively uniform dispersion can be obtained; Secondly, the coordination polymer microspheres and the sulfurization agent are dispersed in ethanol according to the mass ratio of 2:4-1:8, and reacted at 120-160° C. for 0.5-6 h to obtain the hollow sulfide microspheres; Finally, the hollow sulfide microspheres are dispersed in a 0.5-2 mol/L aqueous sodium borohydride solution for 0.5-2 h to obtain the sulfide hollow microspheres with enriched sulfur vacancies. The whole reaction process is simple and cost-saving under a mild reaction condition.

After verifying by tests, the relative content of sulfur vacancies in the sulfide hollow microspheres with enriched sulfur vacancies is up to 65.34%; the electrode possesses a specific capacity of 763.4 C g$^{-1}$ and a capacity retention of 91.3%; and the Coulombic efficiency maintains at 100% without decaying after 5000 cycles under a current density of 10 A g$^{-1}$.

Further description will be given below in conjunction with the accompanying drawings and specific embodiments.

DETAILED DESCRIPTION OF THE EMBODIMENTS

In the present disclosure, the chemical raw materials used were purchased from Beijing Tongguang Fine Chemical Co., Ltd. and were of analytical grade.

Example 1

0.2 mmol of cobalt nitrate and 0.1 mmol of nickel nitrate were dissolved in a mixed solution of 15 mL of N, N-dimethylformamide and 15 mL of acetone; 0.15 mmol of isophthalic acid was added into the above solution, stirred at room temperature for 6 h, and transferred to a stainless-steel autoclave lined Teflon to perform a solvothermal reaction at a temperature of 160° C. for 4 h; after cooling down to room temperature, a resulting product was subjected to centrifuging, washing and vacuum drying to obtain nickel-cobalt coordination polymer microspheres, solid spheres with a particle size of about 1-2 μm.

Example 2

0.2 mmol of cobalt nitrate and 0.1 mmol of nickel nitrate were dissolved in a mixed solution of 15 mL of N, N-dimethylformamide and 15 mL of acetone; 0.15 mmol of isophthalic acid was added into the above solution, stirred at room temperature for 6 h, and transferred to a stainless-steel autoclave lined Teflon to perform a solvothermal reaction at a temperature of 160° C. for 4 h; after cooling down to room temperature, a resulting product was subjected to centrifuging, washing and vacuum drying to obtain nickel-cobalt coordination polymer microspheres; 30 mg of nickel-cobalt coordination polymer microspheres and 60 mg of thioacetamide were dissolved in 30 mL of absolute ethanol; the mixture was subjected to ultrasonic treatment for 15 min, and transferred to a stainless-steel autoclave lined Teflon to perform a solvothermal reaction at a temperature of 160° C. for 2 h to obtain the sulfide core-shell microspheres with an average size of 1-2 μm and rough surface.

Example 3

0.133 mmol of cobalt nitrate and 0.067 mmol of nickel nitrate were dissolved in a mixed solution of 15 mL of N, N-dimethylformamide and 15 mL of acetone; 0.2 mmol of isophthalic acid was added into the above solution, stirred at room temperature for 6 h, and transferred to a stainless-steel autoclave lined Teflon to perform a solvothermal reaction at a temperature of 160° C. for 4 h; after cooling, a resulting product was subjected to centrifuging, washing and vacuum drying to obtain nickel-cobalt coordination polymer microspheres; 30 mg of nickel-cobalt coordination polymer microspheres and 60 mg of thioacetamide were weighed, and dispersed in 30 ml of absolute ethanol; the mixture was subjected to ultrasonic treatment for 15 min, and transferred to the hydrothermal kettle to perform a solvothermal reaction at a temperature of 160° C. for 6 h to obtain the sulfide hollow microspheres with the average size of 1-2 μm and the shell thickness of about 20-30 nm; at the same time, according to the peak area fitted in X-ray spectrum, a relative content of sulfur vacancies in the product is 31.24%.

Example 4

0.133 mmol of cobalt nitrate and 0.067 mmol of nickel nitrate were dissolved in a mixed solution of 15 mL of N, N-dimethylformamide and 15 mL of acetone; 0.2 mmol of isophthalic acid was added into the above solution, stirred at room temperature for 6 h, and transferred to a stainless-steel autoclave lined Teflon to perform a solvothermal reaction at a temperature of 160° C. for 4 h; after cooling, a resulting product was subjected to centrifuging, washing and vacuum drying to obtain nickel-cobalt coordination polymer microspheres; 30 mg of nickel-cobalt coordination polymer microspheres and 60 mg of thioacetamide were weighed, and dispersed in 30 ml of absolute ethanol; the mixture was subjected to ultrasonic treatment for 15 min, and transferred to a stainless-steel autoclave lined Teflon to perform a solvothermal reaction at a temperature of 160° C. for 6 h to obtain a hollow sulfide; 30 mg of the hollow sulfide was dispersed into a 1 mol/L aqueous sodium borohydride solution, stirred at room temperature for 1 h, then the resulting product was subjected to centrifuging, washing with deionized water and vacuum drying to obtain sulfide hollow microspheres with enriched sulfur vacancies. The product reduced by sodium borohydride has a microspherical morphology, with a particle size of 1-2.5 μm and a slightly reduced crystallinity; according to the peak area fitted by the X-ray spectrum, the relative content of sulfur vacancies in the product is 45.64%.

Example 5

0.133 mmol of cobalt nitrate and 0.067 mmol of nickel nitrate were dissolved in a mixed solution of 15 mL of N, N-dimethylformamide and 15 mL of acetone; 0.2 mmol of isophthalic acid was added into the above solution, stirred at room temperature for 6 h, and transferred to a stainless-steel autoclave lined Teflon to perform a solvothermal reaction at a temperature of 160° C. for 4 h; after cooling, a resulting product was subjected to centrifuging, washing and vacuum drying to obtain nickel-cobalt coordination polymer microspheres; 30 mg of nickel-cobalt coordination polymer microspheres and 60 mg of thioacetamide were weighed, and dispersed in 30 ml of absolute ethanol; the mixture was subjected to ultrasonic treatment for 15 min, and transferred to a stainless-steel autoclave lined Teflon to perform a solvothermal reaction at a temperature of 160° C. for 6 h to obtain a hollow sulfide; 30 mg of the hollow sulfide was dispersed into a 1 mol/L aqueous sodium borohydride solution, stirred at room temperature for 2 h, then the resulting product was subjected to centrifuging, washing with deionized water and vacuum drying to obtain sulfide hollow microspheres with enriched sulfur vacancies. The product reduced by sodium borohydride maintains a microspherical morphology, with a particle size of 1-2 μm, and a shell thickness of 15-25 nm; according to the peak area fitted in the X-ray spectrum, the relative content of sulfur vacancies in the product is 65.34%.

Figure 1:
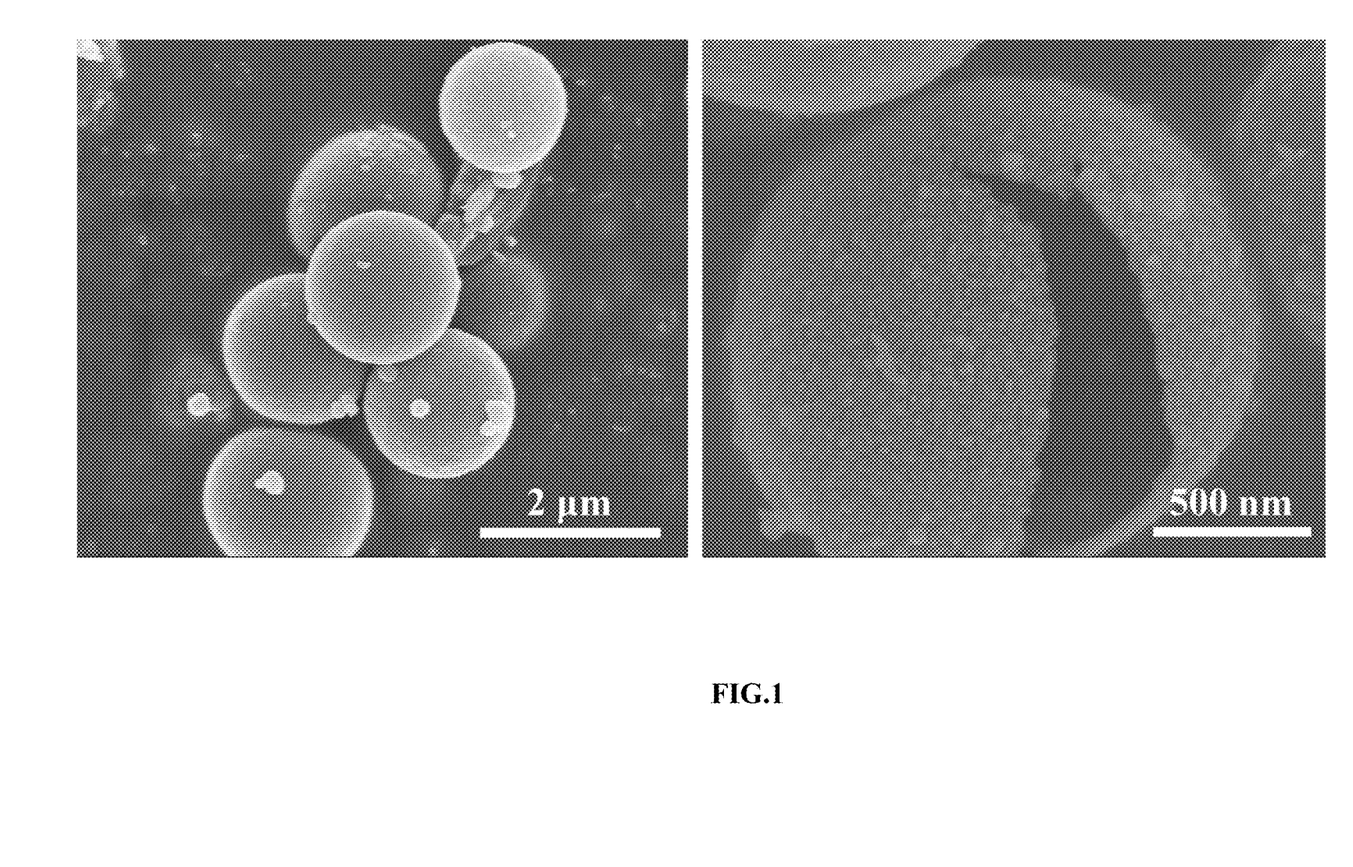
FIG. 1 is a SEM image of the sulfide hollow microspheres with enriched sulfur vacancies prepared in Example 5 of the present disclosure.
Figure 2:
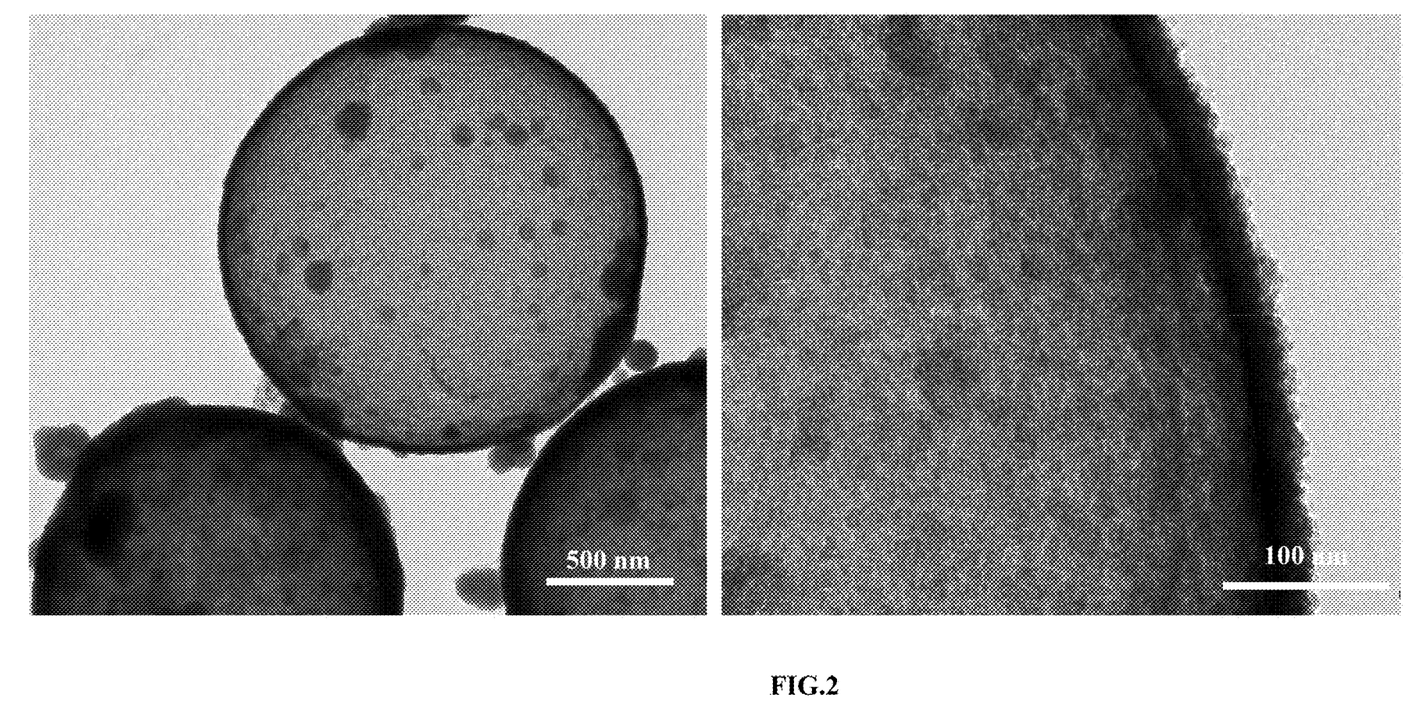
FIG. 2 is a TEM image of the sulfide hollow microspheres with enriched sulfur vacancies prepared in Example 5 of the present disclosure.
Figure 3:
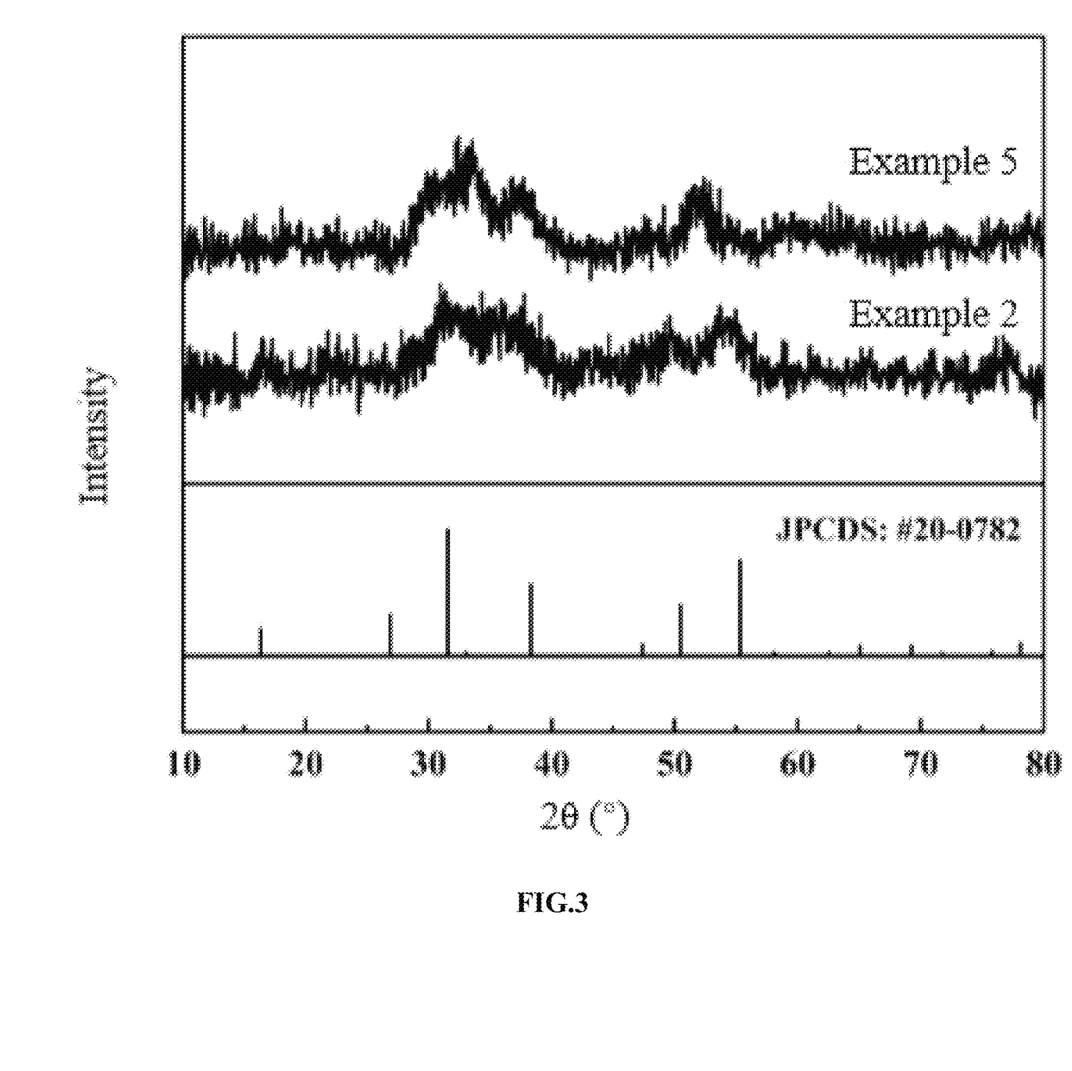
FIG. 3 is a XRD pattern of the sulfide hollow microspheres with enriched sulfur vacancies prepared in Example 5 and the sulfide prepared in Example 2.
Figure 4:
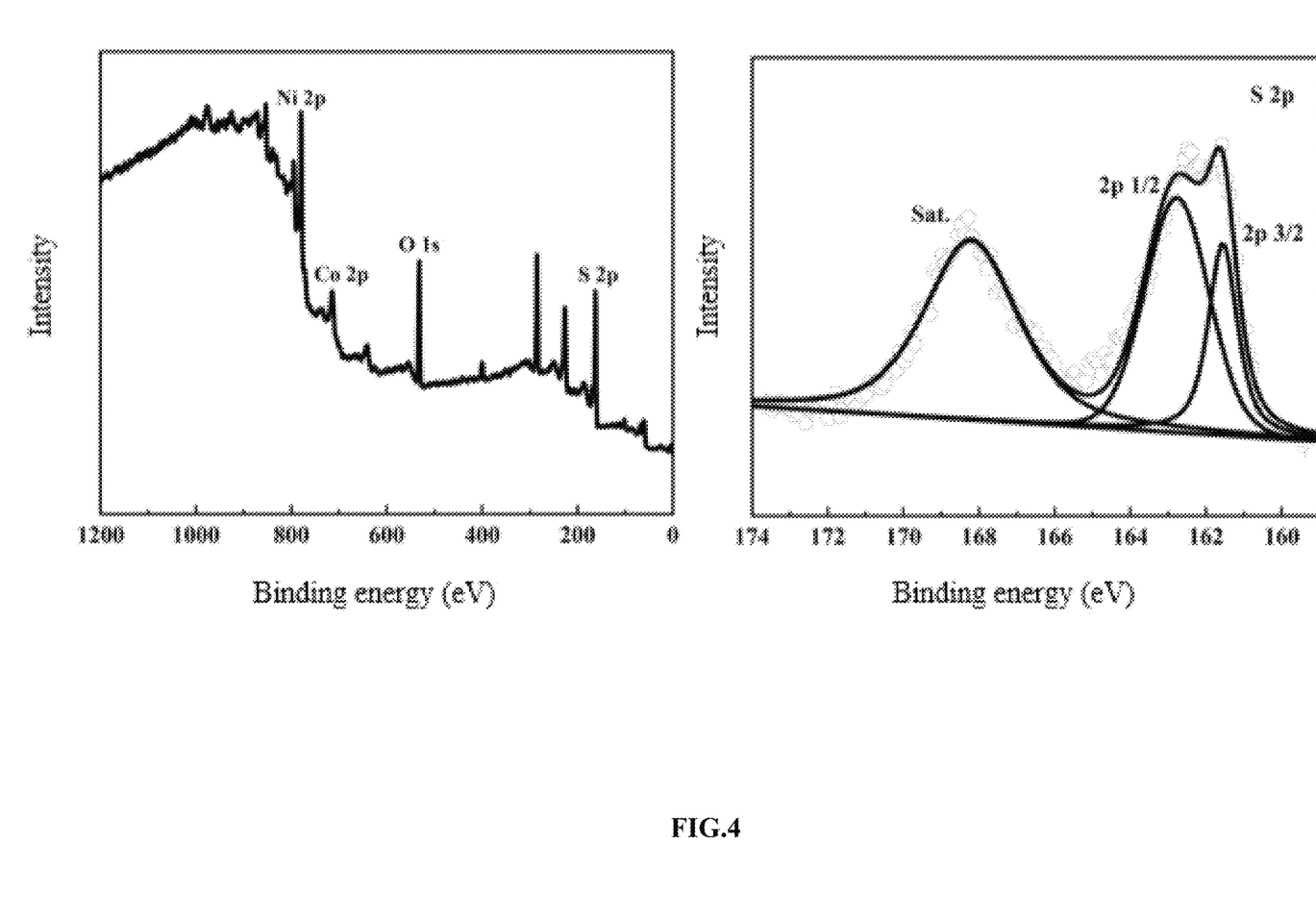
FIG. 4 is a XPS spectrum of the sulfide hollow microspheres with enriched sulfur vacancies prepared in Example 5 and a high-resolution XPS spectrum of S element.

SEM results in FIG. 1 show that the diameter of the sulfide hollow microspheres with enriched sulfur vacancies is about 1-2 μm, and the surface of the microspheres is rough; The TEM results of the sample in FIG. 2 show that the microspheres have a hollow structure with the shell thickness of 10-20 nm; XRD results (FIG. 3) show that the diffraction peaks of the sulfide hollow microspheres with enriched sulfur vacancies coincides with the standard PDF card (JPCDS: #20-0278) after reduction treatment; XPS results show that Ni, Co and S elements exist in the sulfide hollow microspheres with enriched sulfur vacancies, and according to the high-resolution XPS spectrum of S, the relative content of S vacancies ($2p^{1/2}$) reaches to 65.34%.

Example 6

The sulfide hollow microspheres with enriched sulfur vacancies prepared in Example 5, acetylene black and polytetrafluoroethylene were mixed according to a mass ratio of 7:2:1, and the slurry was coated on a 1×1 cm² nickel foam, dried at 80° C. under vacuum for 12 h to acquire a working electrode. Cyclic voltammetry and galvanostatic charge-discharge tests were performed with an electrochemical workstation using a 3 M KOH aqueous solution as an electrolyte, a Hg/HgO electrode as a reference electrode, and a Pt electrode as a counter electrode.

Figure 5:
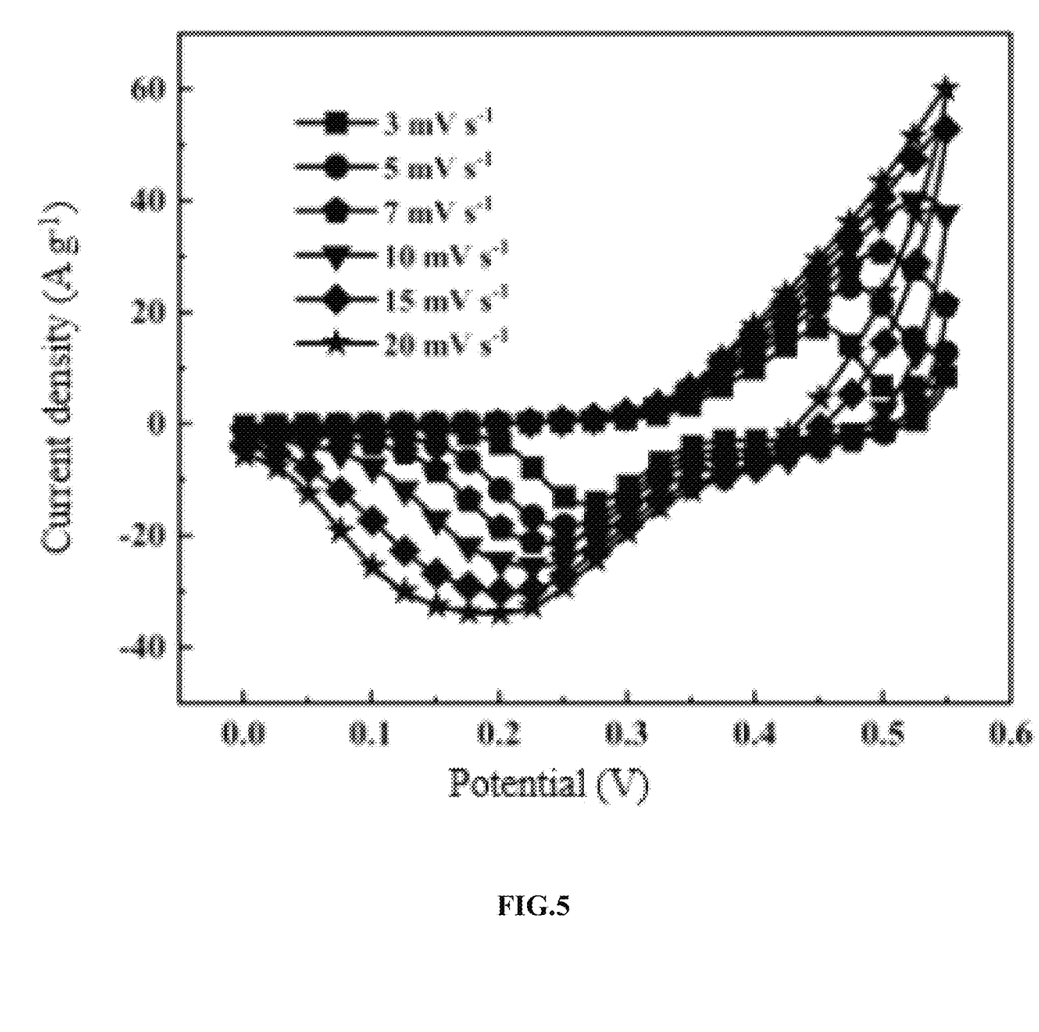
FIG. 5 is a CV curve of Example 6 under different scanning rates.
Figure 6:
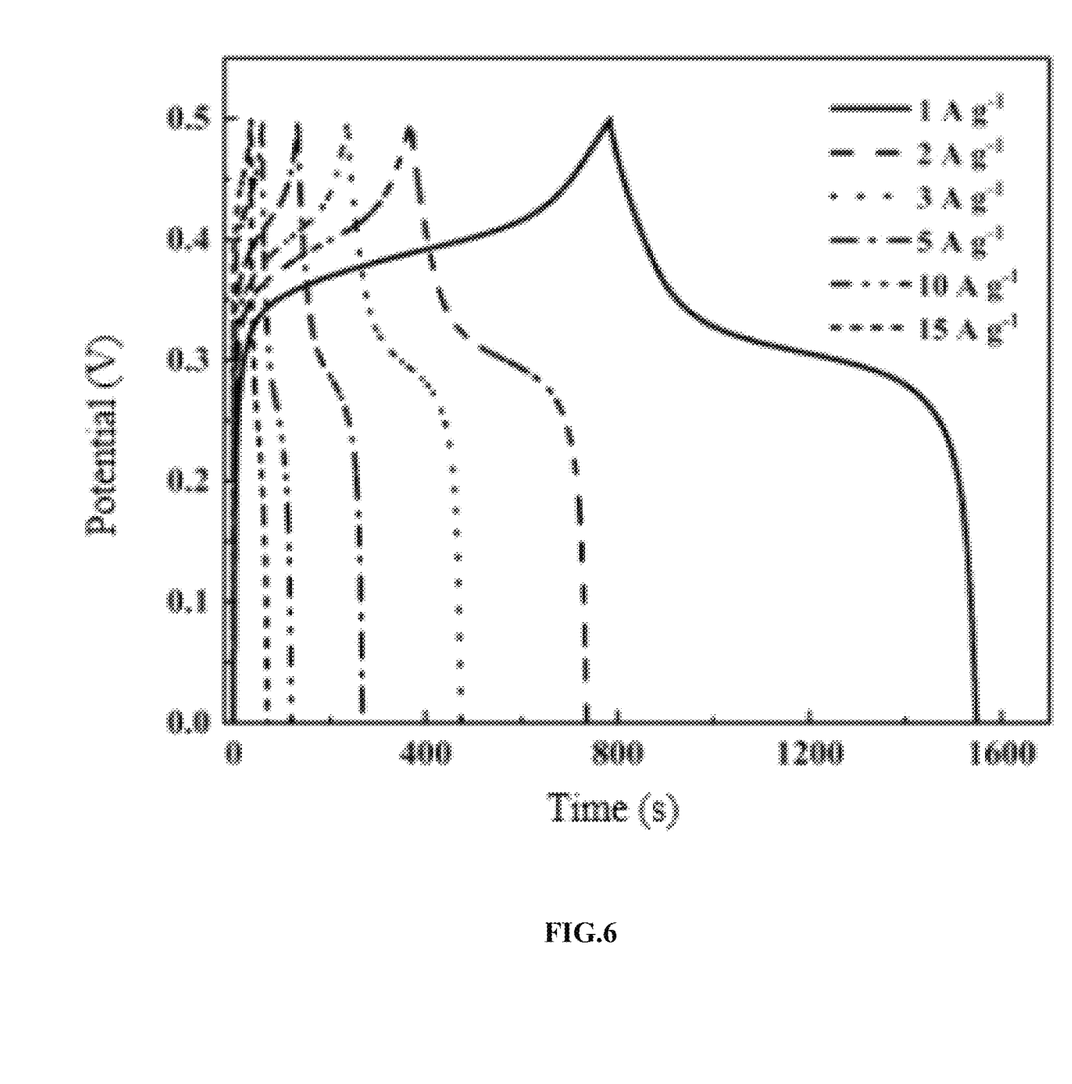
FIG. 6 is a GCD curve of Example 6 under different current densities.
Figure 7:
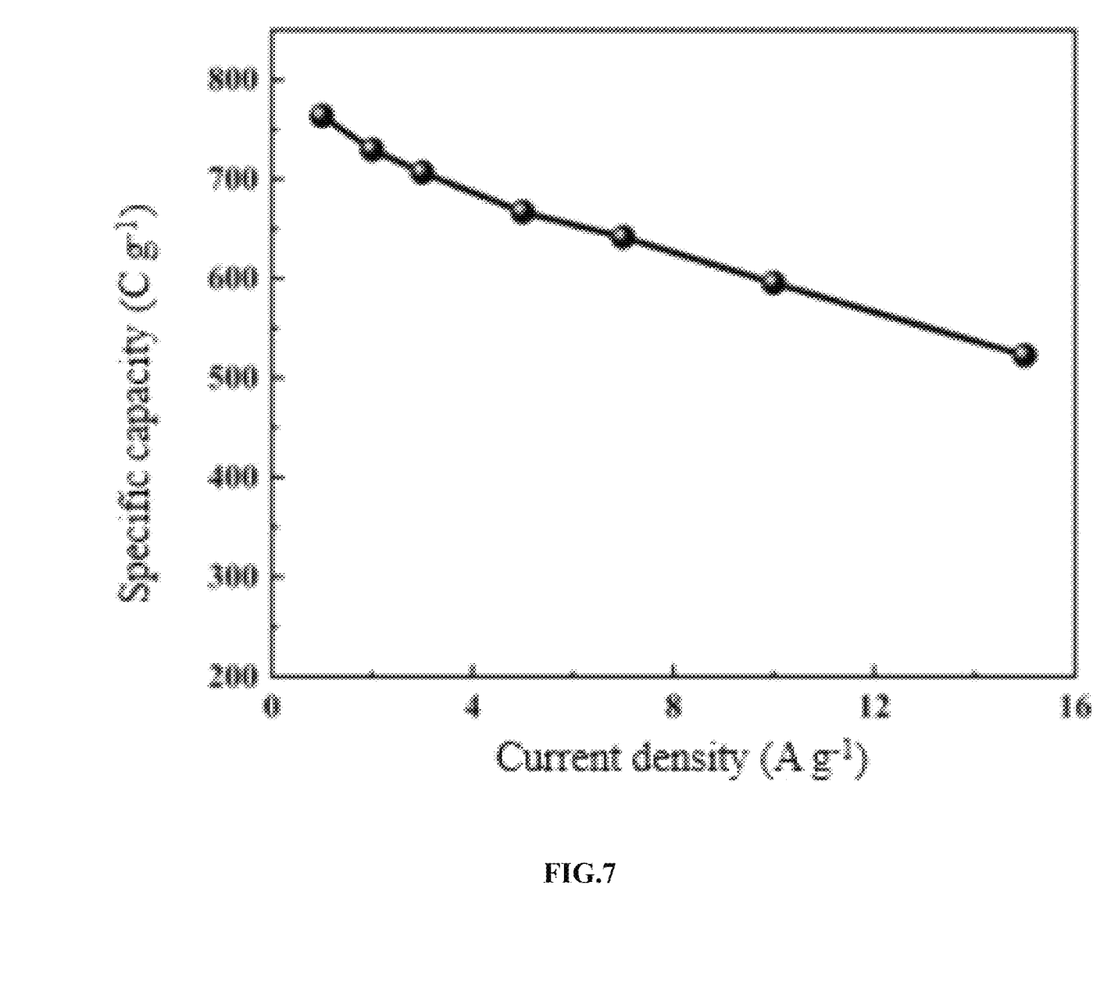
FIG. 7 shows the specific capacity of Example 6 under different current densities.
Figure 8:
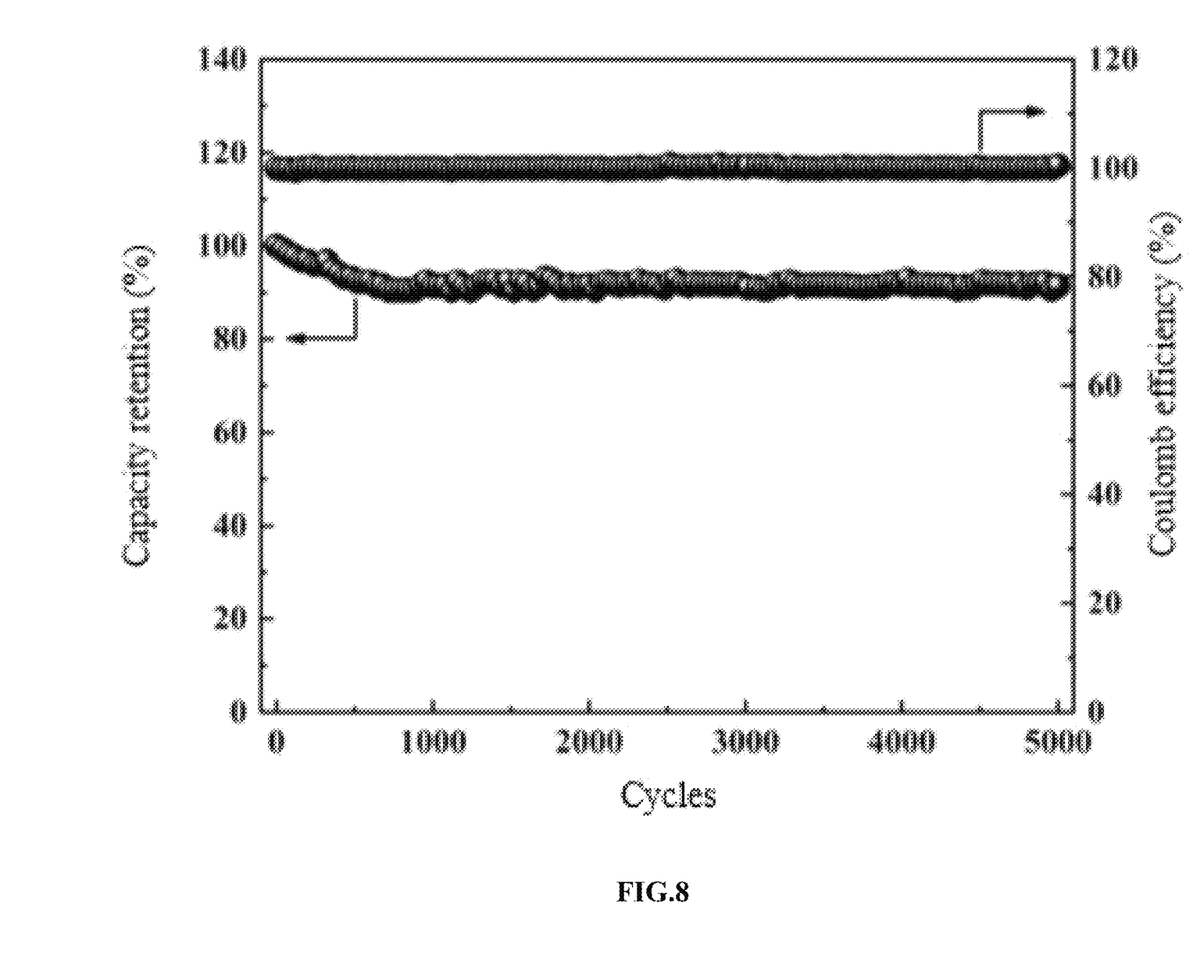
FIG. 8 is a graph showing the specific capacity and Coulombic efficiency of Example 6 after 5000 cycles.

It can be seen from FIG. 5 that the curve shows an obvious redox peaks. With the increase of a CV scan rate, anionic and cathodic peaks exhibit slight shifts for positive and negative direction, respectively; secondly, during the charge-discharge process, the GCD curve of the sample (FIG. 6) shows an obvious charge-discharge plateau, showing a typical behavior of battery-like electrode materials; when the current density is 1 A $g^{-1}$, the specific capacity is 763.4 C $g^{-1}$ (specific capacitance is 1526.8 F $g^{-1}$, FIG. 7). The capacity retention of the electrode remains above 90%, and the Coulombic efficiency maintains 100% without decaying after 5000 cycles under a current density of 10 A $g^{-1}$, as shown in FIG. 8.

What is claimed is:

1. A sulfide hollow microsphere with enriched sulfur vacancies prepared through the following steps:
    1) Dissolving cobalt nitrate and nickel nitrate in a mixed solution of N, N-dimethylformamide and acetone to obtain a solution A;
    2) Dissolving a chelating agent with a carboxylate group in the solution A to obtain a solution B;
    3) Transferring the solution B into a stainless-steel autoclave lined Teflon and reacting at 140-160° C. for 1-5 h, cooling, centrifuging, washing and drying to obtain a coordination polymer microsphere;
    4) Dissolving the coordination polymer microsphere and a sulfurization agent in an organic solvent, reacting at 120-160° C. for 0.5-6 h, cooling, centrifuging, washing and drying to obtain a sulfide hollow microsphere;
    5) Dispersing the hollow sulfide microsphere in a sodium borohydride solution, stirring for 0.5-2 h, centrifuging, washing and drying to obtain sulfide hollow microspheres with enriched sulfur vacancies;
    wherein a particle size and a shell thickness of the sulfide hollow microsphere are 1-2.5 μm and 15-30 nm, respectively; and
    the sulfur vacancies accounts for 45.64% to 65.34% in the sulfide hollow microsphere.

2. The sulfide hollow microspheres with enriched sulfur vacancies according to claim 1, wherein in step 1), a volume ratio of N, N-dimethylformamide and acetone is 1:1, and a molar ratio of cobalt nitrate and nickel nitrate is 2-4:1-2.

3. The sulfide hollow microspheres with enriched sulfur vacancies according to claim 1, wherein in step 2), the chelating agent is selected from the group consisting of isophthalic acid, trimesic acid, terephthalic acid, and 3,5-pyridinedicarboxylic acid; the chelating agent is dissolved in the solution A and stirred for 6 h, and a molar ratio of the chelating agent to a total amount of cobalt nitrate and nickel nitrate is 1-2:2-4.

4. The sulfide hollow microspheres with enriched sulfur vacancies according to claim 1, wherein in step 3), the washing treatment is conducted with absolute ethanol, and the drying is under vacuum.

5. The sulfide hollow microspheres with enriched sulfur vacancies according to claim 1, wherein in step 4), the sulfurization agent is selected from the group consisting of thioacetamide, thiourea, L-cysteine, and sodium sulfide, a mass ratio of the coordination polymer microsphere to the sulfurization agent is 2-4:1-8, the organic solvent is absolute ethanol, and the dispersion is performed with ultrasonic treatment for 15 min.

6. The sulfide hollow microspheres with enriched sulfur vacancies according to claim 1, wherein in step 4), the washing treatment is conducted with absolute ethanol, and the drying is under vacuum.

7. The sulfide hollow microspheres with enriched sulfur vacancies according to claim 1, wherein in step 5), a concentration of the sodium borohydride aqueous solution is 0.5-2 mol/L, preferably 1 mol/L, the washing is conducted by deionized water, and the drying is under vacuum.

8. An application of the sulfide hollow microspheres with enriched sulfur vacancies according to claim 1 for preparing electrode materials.

9. The application according to claim 8, wherein in step 1), a volume ratio of N, N-dimethylformamide and acetone is 1:1, and a molar ratio of cobalt nitrate and nickel nitrate is 2-4:1-2.

10. The application according to claim 8, wherein in step 2), the chelating agent is selected from the group consisting of isophthalic acid, trimesic acid, terephthalic acid, and 3,5-pyridinedicarboxylic acid, the chelating agent is dissolved in the solution A and stirred for 6 h, and a molar ratio of the chelating agent to a total amount of cobalt nitrate and nickel nitrate is 1-2:2-4.

11. The application according to claim 8, wherein in step 3), the washing is conducted with absolute ethanol, and the drying is vacuum drying.

12. The application according to claim 8, wherein in step 4), the sulfurization agent is selected from the group consisting of thioacetamide, thiourea, L-cysteine, and sodium sulfide, a mass ratio of the coordination polymer microsphere to the sulfurization agent is 2-4:1-8, the organic solvent is absolute ethanol, and the dispersion is ultrasonic dispersion for 15 min.

13. The application according to claim 8, wherein in step 4), the washing is conducted by washing with absolute ethanol, and the drying is under vacuum.

14. The application according to claim 8, wherein in step 5), a concentration of the aqueous sodium borohydride solution is 0.5-2 mol/L, preferably 1 mol/L, the washing is conducted with deionized water, and the drying is under vacuum.

15. The application according to claim 8, wherein the electrode material is a battery-type electrode material.

16. The application according to claim 9, wherein the electrode material is a battery-type electrode material.

17. The application according to claim 10, wherein the electrode material is a battery-type electrode material.

18. The application according to claim 11, wherein the electrode material is a battery-type electrode material.

* * * * *